United States Patent
Stark et al.

(10) Patent No.: US 12,088,358 B2
(45) Date of Patent: Sep. 10, 2024

(54) PREDICTIVE QUALITY OF SERVICE VIA CHANNEL AGGREGATION

(71) Applicant: Robert Bosch GmbH, Stuttgart (DE)

(72) Inventors: Maximilian Stark, Hamburg (DE); Hugues Narcisse Tchouankem, Hemmingen (DE); João D. Semedo, Pittsburgh, PA (US); Maja Rudolph, Madison, WI (US)

(73) Assignee: Robert Bosch GmbH (DE)

( * ) Notice: Subject to any disclaimer, the term of this patent is extended or adjusted under 35 U.S.C. 154(b) by 311 days.

(21) Appl. No.: 17/682,777

(22) Filed: Feb. 28, 2022

(65) Prior Publication Data

US 2023/0275676 A1 Aug. 31, 2023

(51) Int. Cl.
*H04B 17/318* (2015.01)
*G06N 3/08* (2023.01)
(52) U.S. Cl.
CPC ............. *H04B 17/318* (2015.01); *G06N 3/08* (2013.01)

(58) Field of Classification Search
CPC ........ H04B 17/318; H04B 17/39; G06N 3/08; G06N 20/00; H04W 52/245; H04W 16/18
See application file for complete search history.

(56) References Cited

U.S. PATENT DOCUMENTS

| | | | |
|---|---|---|---|
| 2020/0076520 A1* | 3/2020 | Jana | H04B 17/327 |
| 2022/0353193 A1* | 11/2022 | Iyer | H04W 28/10 |
| 2024/0129050 A1* | 4/2024 | Pfadler | H04B 17/373 |

* cited by examiner

*Primary Examiner* — Elton Williams
(74) *Attorney, Agent, or Firm* — Dickinson Wright PLLC

(57) ABSTRACT

A wireless system includes a controller that is configured to measure a first Reference Signal Received Power (RSRP1) from a first carrier at a first time, measure a second Reference Signal Received Power (RSRP2) from a second carrier at a second time, annotate the RSRP1 to the first carrier and the RSRP2 to the second carrier, in response to the first time and the second time being within a contemporaneous period, associate the RSRP1 and RSRP2 to the contemporaneous period, create an N-Dimension vector of RSRP1 and RSRP2 at the contemporaneous period, process the N-Dimension vector via a trainable function to obtain a predicted data rate, and in response to the predicted data rate falling below a normal operating range threshold, operate the system in a low bandwidth mode.

20 Claims, 7 Drawing Sheets

PREDICTIVE QUALITY OF SERVICE VIA CHANNEL AGGREGATION

TECHNICAL FIELD

This disclosure relates generally to predictive quality of service (pQoS) in a network. More specifically, this application relates to predictive quality of service (QoS) via a machine learning system trained using channel aggregation.

BACKGROUND

In network analysis, quality of service (QoS) is a measurement of the performance of the network as observed by a user of the network. QoS may be used in multiple different types of networks such as wireless networks, cloud networks, computer networks, etc. QoS often considers multiple aspects of the network such as packet loss, bit rate, throughput, transmission delay, etc. QoS is especially important to the transport of data with special requirements such as time critical data for audio transmissions, video transmissions, or safety information regarding operating machinery or systems.

SUMMARY

A method of operating a wireless receiver system includes measuring a first Reference Signal Received Power (RSRP1) from a first carrier at a first time, measuring a second Reference Signal Received Power (RSRP2) from a second carrier at a second time, annotating the RSRP1 to the first carrier and the RSRP2 to the second carrier, in response to the first time and the second time being within a contemporaneous period, associating the RSRP1 and RSRP2 to the contemporaneous period, creating an N-Dimension vector of RSRP1 and RSRP2 at the contemporaneous period, processing the N-Dimension vector via a trainable function to obtain a predicted data rate, and in response to the predicted data rate falling below a normal operating range threshold, operating the system in a low bandwidth mode.

A wireless system includes a controller that is configured to measure a first Reference Signal Received Power (RSRP1) from a first carrier at a first time, measure a second Reference Signal Received Power (RSRP2) from a second carrier at a second time, annotate the RSRP1 to the first carrier and the RSRP2 to the second carrier, in response to the first time and the second time being within a contemporaneous period, associate the RSRP1 and RSRP2 to the contemporaneous period, create an N-Dimension vector of RSRP1 and RSRP2 at the contemporaneous period, process the N-Dimension vector via a trainable function to obtain a predicted data rate, and in response to the predicted data rate falling below a normal operating range threshold, operate the system in a low bandwidth mode A wireless system associated with a vehicle includes a processor and a memory that includes instructions that are executed by the processor. The instructions cause the processor to measure a first Reference Signal Received Power (RSRP1) from a first carrier at a first time, measure a second Reference Signal Received Power (RSRP2) from a second carrier at a second time, annotate the RSRP1 to the first carrier and the RSRP2 to the second carrier, in response to the first time and the second time being within a contemporaneous period, associate the RSRP1 and RSRP2 to the contemporaneous period, create an N-Dimension vector of RSRP1 and RSRP2 at the contemporaneous period, process the N-Dimension vector via a trainable function to obtain a predicted data rate, and in response to the predicted data rate falling below a normal operating range threshold, operate the system in a low bandwidth mode

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Figure 1:
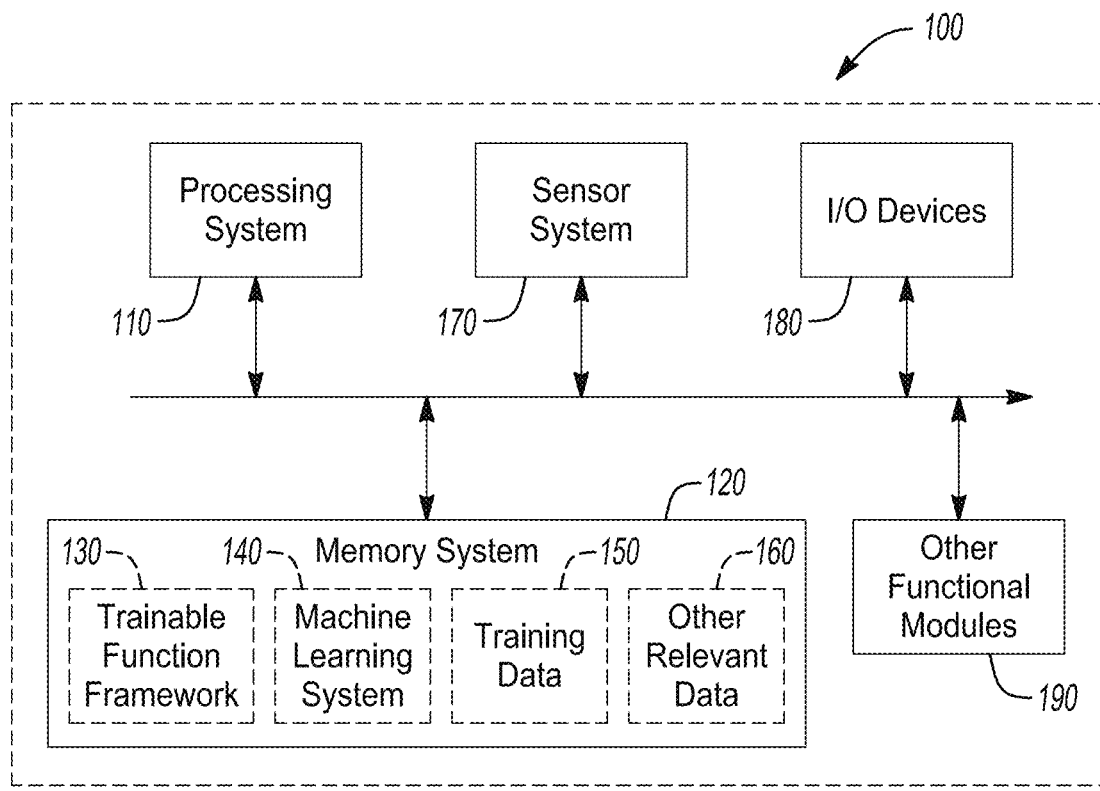
FIG. 1 is a diagram of an example of a system relating to predictive QoS with channel aggregation via a trainable function according to an example embodiment of this disclosure.

FIG. 1 is a diagram of a non-limiting example of a system 100, which is configured to train, employ, and/or deploy at least one machine learning system 140 according to an example embodiment. The system 100 includes at least a processing system 110 with at least one processing device. For example, the processing system 110 includes at least an electronic processor, a central processing unit (CPU), a graphics processing unit (GPU), a microprocessor, a micro-controller, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 may include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For instance, in an example embodiment, the memory system 120 includes at least a cloud-based storage system (e.g. cloud-based database system), which is remote from the processing system 110 and/or other components of the system 100.

The memory system 120 includes at least a trainable function framework 130, the machine learning system 140, training data 150, and other relevant data 160, which are stored thereon. The trainable function framework 130 includes computer readable data with instructions, which, when executed by the processing system 110, is configured to predict quality of service in a network via a machine learning system trained using channel aggregation. The computer readable data can include instructions, code, routines, various related data, any software technology, or any number and combination thereof.

In an example embodiment, the machine learning system 140 includes a trainable function, a neural network (NN), a convolutional neural network (CNN), a continuous discrete recurrent Kalman network (CDRKN), any suitable encoding network, any suitable artificial neural network model, or any number and combination thereof. Also, the training data 150 includes at least a sufficient amount of sensor data, time-series data, dataset data from a number of domains, few-shot examples, few-shot samples, various loss data (e.g., various loss output data, various task loss data, various outlier loss data, etc.), various weight data, and various parameter data, as well as any related machine learning data that enables the system 100 to provide the trainable function framework 130, as described herein. Meanwhile, the other relevant data 160 provides various data (e.g. operating system, machine learning algorithms, anomaly score data, etc.), which enables the system 100 to perform the functions as discussed herein.

The system 100 is configured to include at least one sensor system 170. The sensor system 170 includes one or more sensors. For example, the sensor system 170 includes a radio frequency (RF) receiver. The sensor system 170 is operable to communicate with one or more other components (e.g., processing system 110 and memory system 120) of the system 100. For example, the sensor system 170 may provide sensor data, which is then used or pre-processed by the processing system 110 to generate suitable input data (e.g., audio data, image data, etc.) for the machine learning system 140. In this regard, the processing system 110 is configured to obtain the sensor data directly or indirectly from one or more sensors of the sensor system 170. The sensor system 170 is local, remote, or a combination thereof (e.g., partly local and partly remote). Upon receiving the sensor data, the processing system 110 is configured to process this sensor data and provide the sensor data in a suitable format (e.g., audio data, image data, etc.) in connection with the trainable function framework 130, the machine learning system 140, the training data 150, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, input/output (I/O) devices 180, and other functional modules 190). In addition, the system 100 is configured to include one or more I/O devices 180 (e.g., display device, keyboard device, microphone device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology that enables components of the system 100 to communicate with each other as described herein. In this regard, the system 100 is operable to at least train, employ, and/or deploy the machine learning system 140 (and/or the trainable function framework 130), as described herein.

One of the biggest advantages of wireless transmission is that, unlike with wired transmission, a user can move around freely within an area of coverage. For this purpose, electromagnetic waves are sent from a transmitter to a receiver. Due to physical effects, the propagation of the electromagnetic waves in the free space is affected. It is therefore the task of any wireless communication system to establish appropriate mechanisms to eliminate or compensate for interference and channel fading. In general, the channel can change over time and frequency. Various channel models, often stochastic channel models, exist to represent these changes as well as possible. In addition, various more complicated channel models can be developed that attempt to represent the real transmission conditions. The respective quality of the channel impact its channel capacity. Similarly, the channel capacity influences the theoretical transmission latency and thus the throughput.

In addition, there are further layers above the physical layer in every communication system. These layers have the task of preparing the incoming data-stream to be transmitted accordingly in packets, providing it with protection mechanisms before the actual bits are then modulated on electromagnetic waves and transmitted from the sender to the receiver.

All these different time-varying mechanisms at different layers of the transmission protocol make an exact prediction of the expected latency and throughput extremely difficult.

Depending on the range of the prediction of the quality of service (QoS), a basic distinction can be made between long-term predictive quality of service (pQoS) and short-term predictive quality of service. This is shown schematically in FIG. 2A and FIG. 2B. FIG. 2B addresses the problem of long-term predictive quality of service. Here, a coverage map is created to predict the availability of a service and thus also the quality of service within the coverage map. This can be used, for example, to predict quality of service along a planned route for a long trip, thus long-term pQoS.

Figure 2A:
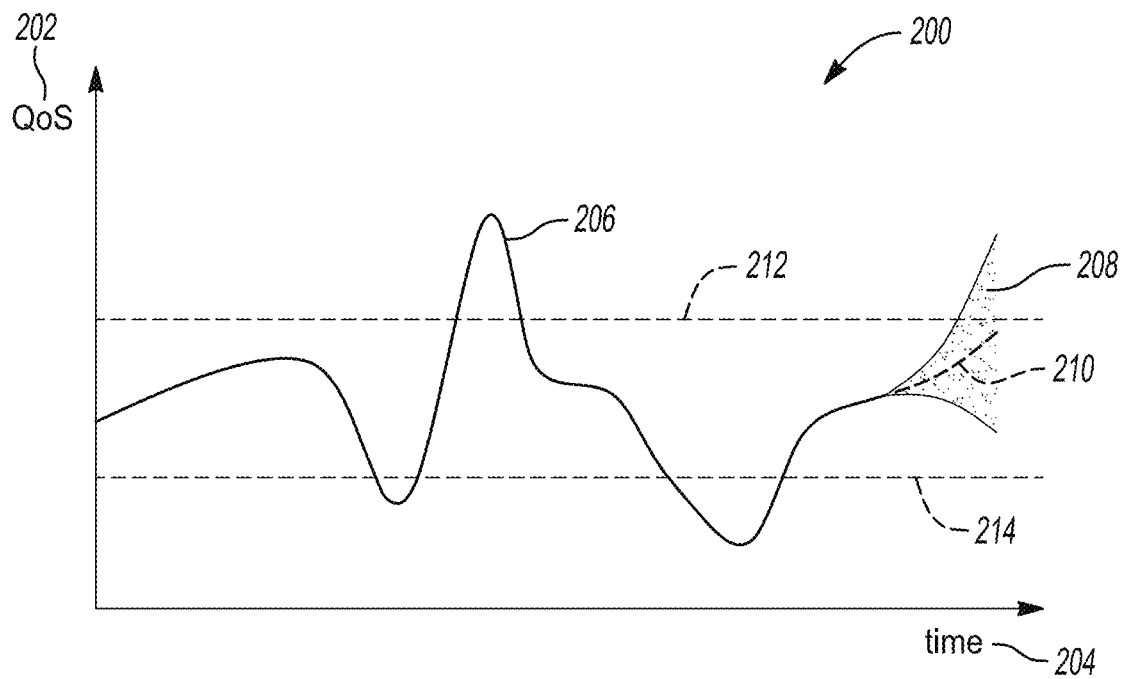
FIG. 2A is a graphical representation of QoS with respect to time.
Figure 2B:
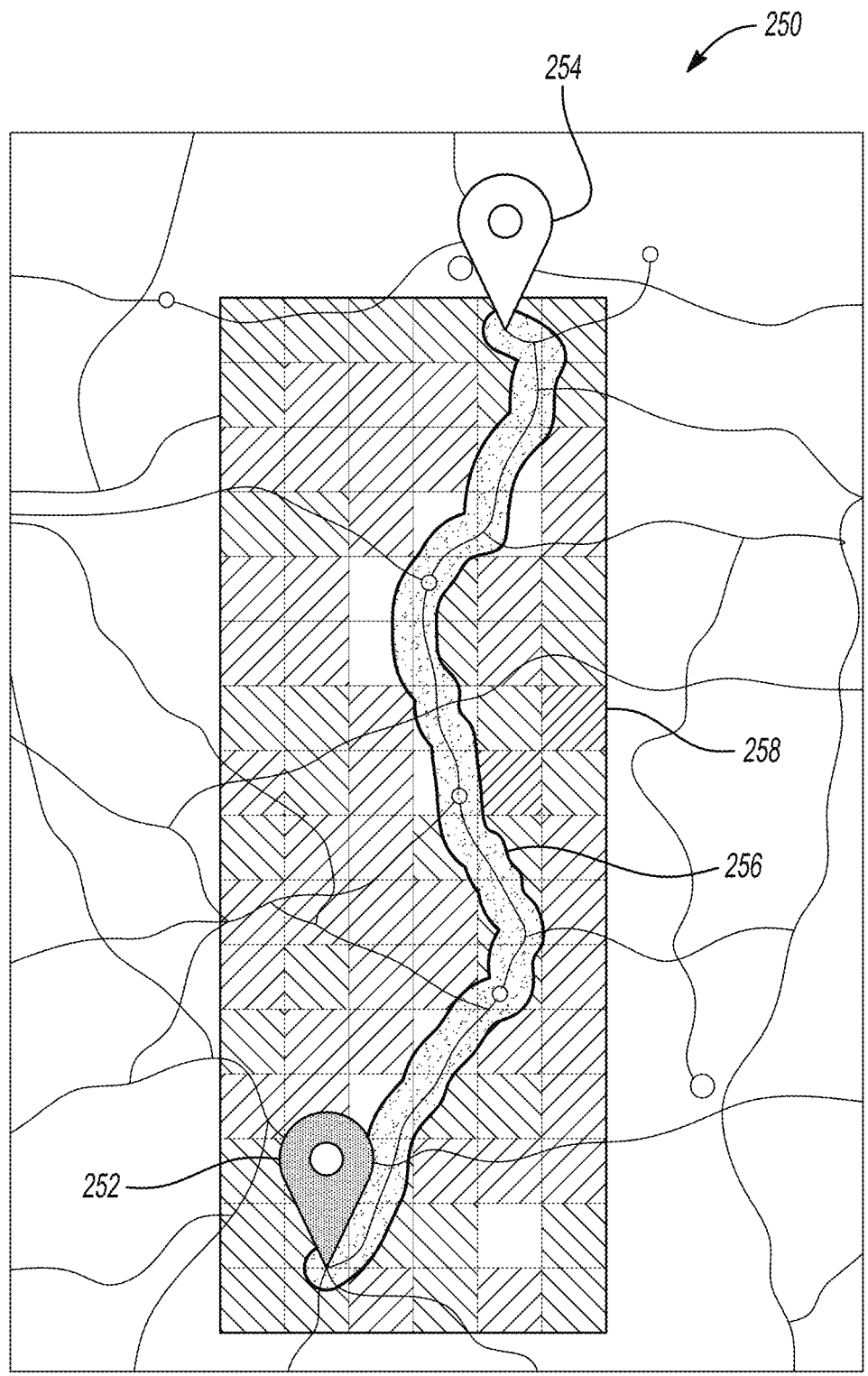
FIG. 2B is a graphical representation of a map of a cellular network QoS grid with a route passing through it.

FIG. 2A is a graphical representation 200 of QoS 202 with respect to time 204. In this graphical representation 200, the actual QoS 206 is shown along with a possible future QoS 208 along with a predicted QoS 210. The graphical representation 200 also illustrates a first threshold 212 between limited service (below) and good service (above), and a second threshold 214 between limited service (above) and no service (below). In other words, above the first threshold 212 a normal operating range in which a system may operate in a normal bandwidth mode. Below the first threshold 212 and above the second threshold 214 is a low operating range in which a system may operate in a low bandwidth mode. And, below the second threshold 214 is a no or zero operating range in which a system may operate in a safe mode.

FIG. 2B is a graphical representation of a map 250 of a cellular network QoS grid with a route passing through it. The map 250 includes a starting location 252 and a destination location 254 with a route 256 from the starting location 252 to the destination location 254. The map 250 includes multiple grids 258 which are shaded indicative of the average QoS within each specific grid.

In contrast, FIG. 2A illustrates the temporal changes of the quality of service on a much shorter time scale, for example a few seconds or even milliseconds. In contrast to the long-term predictive quality of service, the short-term project quality of service is concerned with predicting short-term drops in channel quality, for example due to deep fades.

Monitoring and estimation of the channel quality via linear models are optimized for certain stochastic channel models. Similarly, due to the aforementioned complexity of the entire communication protocol, a prediction of latency and throughput is not possible by purely predicting physical layer aspects such as the channel quality. In this disclosure, the use of data-based machine learning with trainable functions, (e.g., neural networks) will be shown to deliver promising results.

Data-based learning methods often require a very large amount of training data to achieve good results. Especially in mobile communication systems which are designed for high reliability, there are certain mechanisms, that are triggered very rarely but are of great relevance for the reliability of the entire communication system and the communication service availability (CSA). Furthermore, modern wireless communication systems leverage a layered approach, i.e., an entire protocol stack exists where each layer of this stack fulfills a specific task. Thus, the machine learning based solution needs to understand the interdependencies between all the layers. Therefore a hybrid modelling approach is beneficial to incorporate domain knowledge in the network design process.

This disclosure presents a system and method to improve the prediction performance of the data rate as quality of service KPI leveraging passive channel state information by incorporating domain knowledge in the data-pre-processing phase. This disclosure presents an advanced feature engineering system and method considering a very integral component of modern communication systems, i.e., carrier aggregation.

Figure 3A:
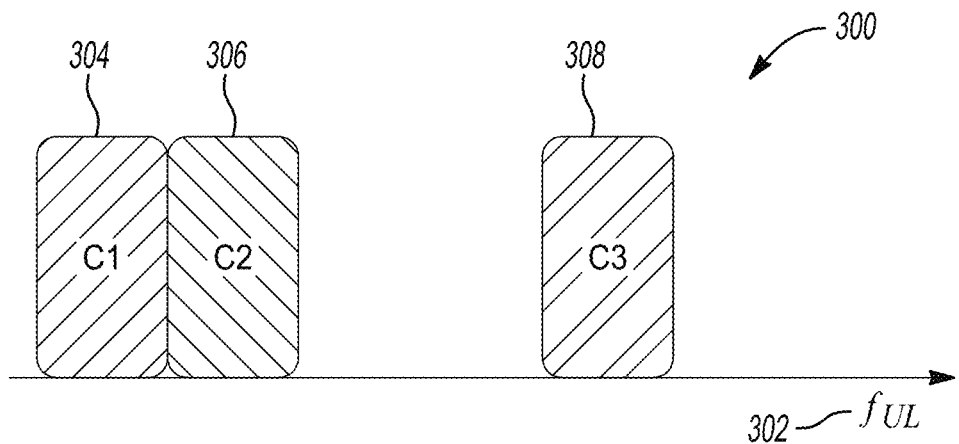
FIG. 3A is a graphical illustration of carriers with respect to frequency.

FIG. 3A shows a schematic depiction of carrier aggregation. To improve the overall available bandwidth that can be used to transmit data, carrier aggregation combines several bands to offer higher data rates.

FIG. 3A is a graphical illustration 300 of carriers 304, 306, 308 with respect to frequency 302. The carriers 304, 306, 308 include a first carrier 304, a second carrier 306, and a third carrier 308. Carriers 304, 306, 308 are a dedicated band for transmission of a signal. that may or may not be from different towers or from the same base station (BS).

Figure 4:
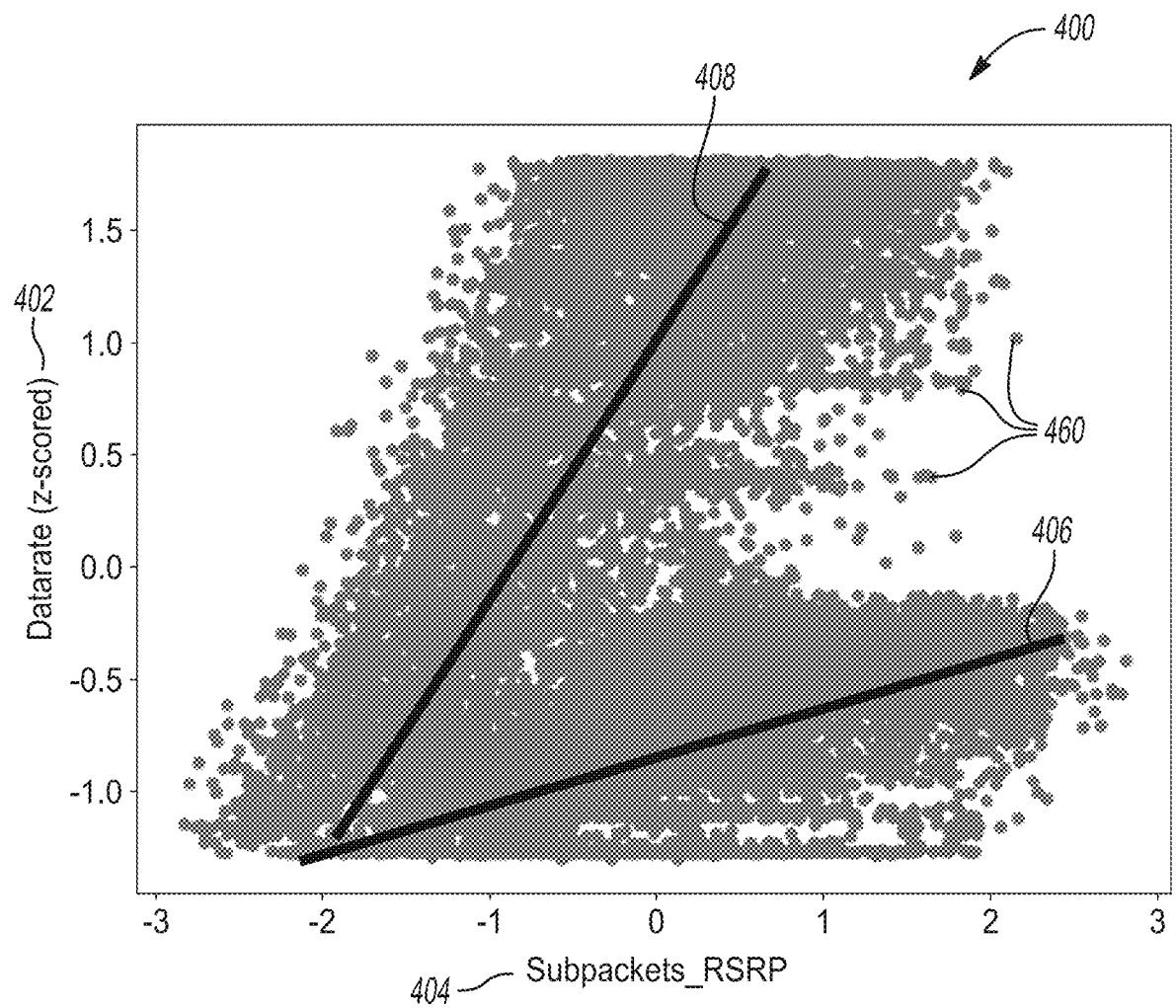
FIG. 4 is a graphical diagram of normalized data rate with respect to subpacket RSRP.

FIG. 4 is a graphical diagram 400 of normalized data rate 402 with respect to subpacket RSRP 404. Each datapoint 410 of the data rate 402 with respect to subpacket RSRP 404 is ploted to form a cloud with a first linear dependence 406 and a second linear dependence 408 both indicative of high correlation.

FIG. 4 shows the observed reference signal received power (RSRP) samples versus the respective data rate achieved. In general, a linear dependence between the RSRP sample and the data rate (vividly observable by the straight lines 406 and 408 in FIG. 4) would indicate a high correlation. Thus, if the feature and the target are highly correlated, inference of the target based on the feature can be done with high accuracy. However, as observed in FIG. 4, that is not a clear straight line but instead two points clouds with two distinct lines each of different slopes. For example, consider the line at the bottom 406, even for the largest RSRP values (good channel) the maximum data rate could not be observed. In turn, the overall correlation between RSRP and data rate is low and a prediction of the datarate purely based on the passive channel measurements is difficult.

Based on the issue that an inference of data rate samples from passive channel measurements is challenging, this disclosure presents a feature engineering system and method to improve the prediction performance by incorporation of the carrier aggregation technique in the training process.

In the previous section, this disclosure presented, based on the observations in FIG. 4, that a direct correlation between the data rate and RSRP does not exist. However, it was shown that two clouds with different slopes can be observed. Therefore, this disclosure presents an adaptation of the training data as shown in FIG. 3B.

Figure 3B:
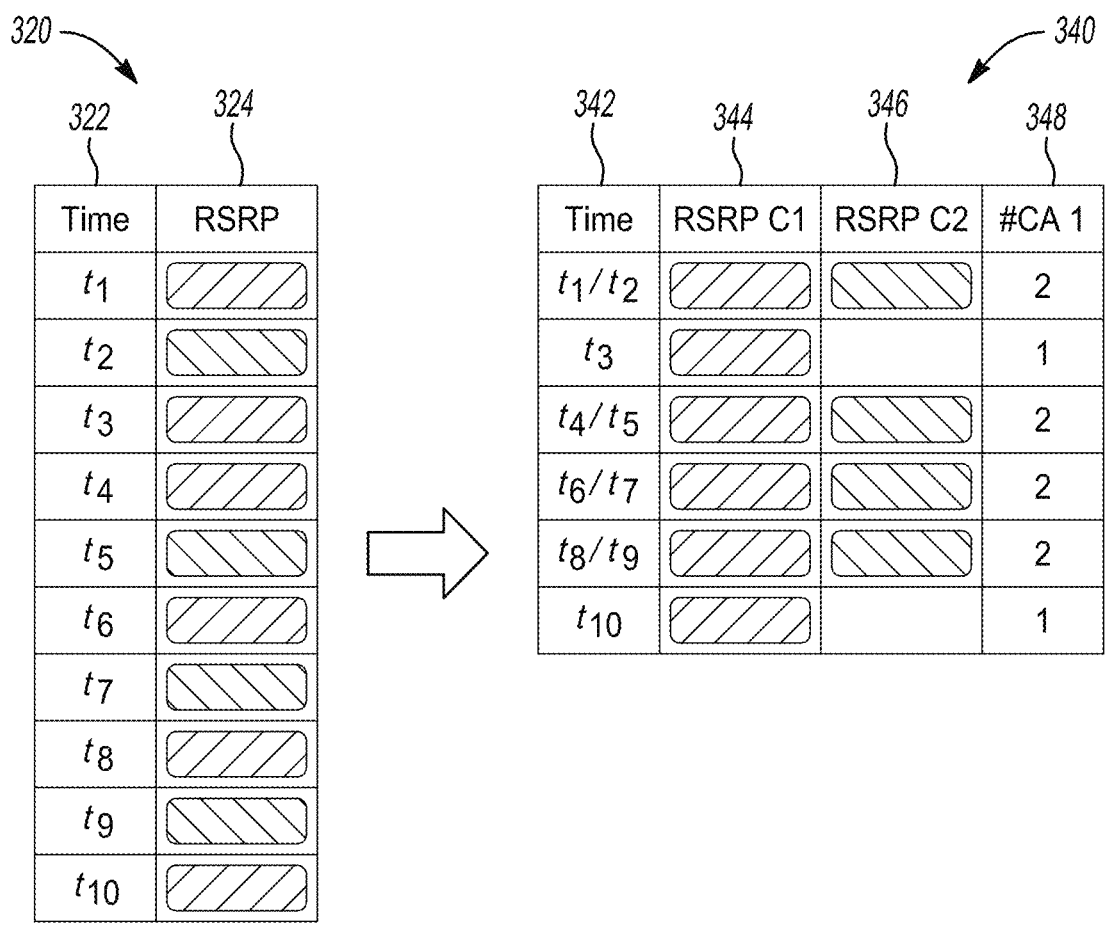
FIG. 3B is a tabular illustration of sequential sample time with associated carrier based on reference signal received power (RSRP) re-ordered via carrier aggregation.

FIG. 3B is a tabular illustration of sequential 320 sample time 322 with associated carrier based on reference signal received power (RSRP) 324 re-ordered via carrier aggregation. A tabular illustration of re-ordered 340 sample time 342 with a first carrier reference signal received power (RSRP) 344, a second carrier reference signal received power (RSRP) 346, and carrier aggregation 348.

The channel measurement reports conveyed from the user equipment (UE) to the base station (BS) include passive measurements and also the cell identifier, i.e., a PCell indicating measurement reports with respect to the primary cell and SCell indicating measurement reports comprising channel quality measurements between the UE and the secondary cell. Therefore, this disclosure presents a flow to perform the following four steps to achieve the result shown in FIG. 3B.

1. Temporal Association: The passive measurement reports are recorded and assigned with a joint timestamp. It is therefore important to merge measurements from the PCell and SCell based on the timestamp. In turn, the time is a unique identifier. It is important to note that the number of carriers considered varies over time, i.e., the machine learning model has to be able to handle "missing" inputs, has to be able to handle asynchronous data. This situation occurs if for example only PCell measurements exist for a particular snapshot.

2. Input Data Reshaping: As depicted in FIG. 3B, temporal association equals a reshaping of the input data fed into the machine learning architecture. Note, that FIG. 3B is an exemplary sketch. In general, other passive features like received signal strength indicator (RSSI), reference signal received quality (RSRQ) etc. can also be considered. In this case, the number of input features is (a number of features) times (a number of carriers).
3. Feature Engineering: In addition, we construct an additional artificial input feature, i.e., the number of active carriers.
4. Process via a trainable function such as a Recurrent Neutral Network: As the sampling rate with which the passive measurements are collected is different from the rate with which the datarate is collected we propose to leverage a recurrent neural network. In general, any trainable function capable of processing time-series is possible.

Alternatively the steps that may be executed by a processor disclosed herein may include:
1. Measuring carriers (such as a first, second, third, etc.) Reference Signal Received Power (RSRP).
2. Annotating the RSRP for each carrier and the time received.
3. Associating the RSRP for each carrier that is contemporaneous at a relative point in time. Note that contemporaneous is relative to the signal transmitted from the towers or BS such that the signals may arrive at slightly different times and are sampled at slightly different times but can be aggregated. A contemporaneous period is a period of time when two signals would be understood as being transmitted supporting carrier aggregation. For example, in FIG. 3B at time $t_1/t_2$ carriers C1 and C2 are within a contemporaneous period and can be aggregated.
4. Creating an N-Dimension vector of all RSRPs at the relative point in time.
5. Producing, via the trainable function (e.g., a NN, CDRKN) and the N-Dimension vector, a predicted data rate.

The predicted data rate (e.g., predicted QoS) may then be used to control the wireless system or a machine coupled with the wireless system.

In one exemplary embodiment of an autonomous or semi-autonomous vehicle, in response to the predicted data rate falling below a no operating range, operating the system in a safe mode in which the safe mode is safely stopping the vehicle, alerting the driver, disabling autonomous control, or other action. Also, in this example, if the data rate is in the low operating range, operate adjust the data rate need by reconfiguring the system such as reconfiguring a video codec or audio codec, such as reducing a sampling rate. If the system has multiple camera, such as a front and rear camera, maybe disabling the rear camera when moving forward to reduce bandwidth.

In another exemplary embodiment, for a mobile (cellular) phone while having a video call, if the bandwidth is predicted to drop to the low operating range, modify video codec or switch off the video while maintaining the audio call, or modify the audio codec to preserve the communication. Also, while having an audio call, the system may modify the audio codec (e.g., reduce the sampling rate).

Also, the use of carrier aggregation is currently only implemented in cellular networks, however this disclosure is not limited to cellular networks (e.g., 3GPP standards, UMTS, WCDMA, LTE, 5G, etc.) but other wireless networks such as the 802.11 WiFi standard, UWB, etc. that may add carrier aggregation in future.

The techniques of this disclosure were tested with a recurrent neural network (i.e., CDRKN) in which the fraction of variance explained over the training epochs. The fraction of variance explained is closely related to the correlation coefficient. Thus, a high FVE is desirable. It was observed that the proposed method largely outperformed MLP.

FVE can be a rather abstract performance measure. Thus, a comparison of the true data rate versus the prediction of the trainable device was performed. The results of the comparison was that the true data rate (ground truth) and prediction of the trained network appeared substantially the same.

Note that the RNN continuously outputs the predicted data rate. However, the true data rate is recorded less frequently. Hence, the training loss is only computed between ground truth samples and the prediction for the corresponding time step. In between, the quality of the output of the network cannot be measured in a supervised manner.

Figure 5A:
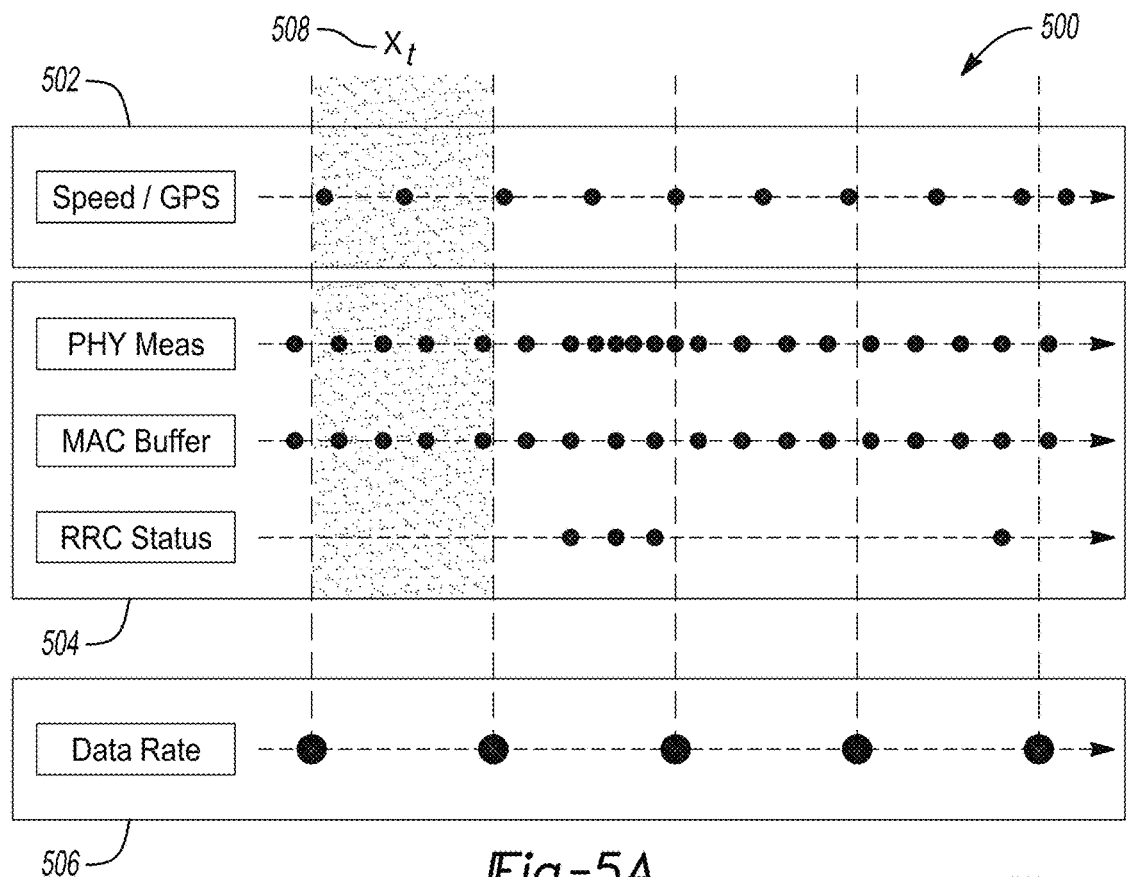
FIG. 5A is a graphical diagram that illustrates asynchronous network input data with synchronous output data rate.

FIG. 5A is a graphical diagram 500 that illustrates asynchronous network input data including payload 502 and network data 504 with synchronous output data 506 (e.g., data-rate). The payload 502 includes user data, such as speed, GPS data, audio data, video data, etc.) and the network data 504 includes system data, such as physical layer (PHY) data, media access control (MAC) data, radio resource control (RRC) status data The figure depicts the features gathered from different layers of the communication protocol stack. As the wireless protocol stack works event-triggered or has different sampling rates across the layers. The actual data rate is observed at the lowest sampling rate. Thus, the input to the trainable function is $X_t$ 508, i.e., a matrix of observations, as multiple observed N-dimensional feature vectors are pooled for an observation window. The general equation can be expressed as:

$$X_t \rightarrow f_\theta(X_t) \rightarrow y_t \qquad (1)$$

In which $X_t$ 508 is the asynchronous input data and $f_\theta(X_t)$ is the trainable function (e.g., a NN, CNN, CDRKN, MLP, or other trainable function) and $y_t$ is the sycronous output of the trainable function.

Figure 5B:
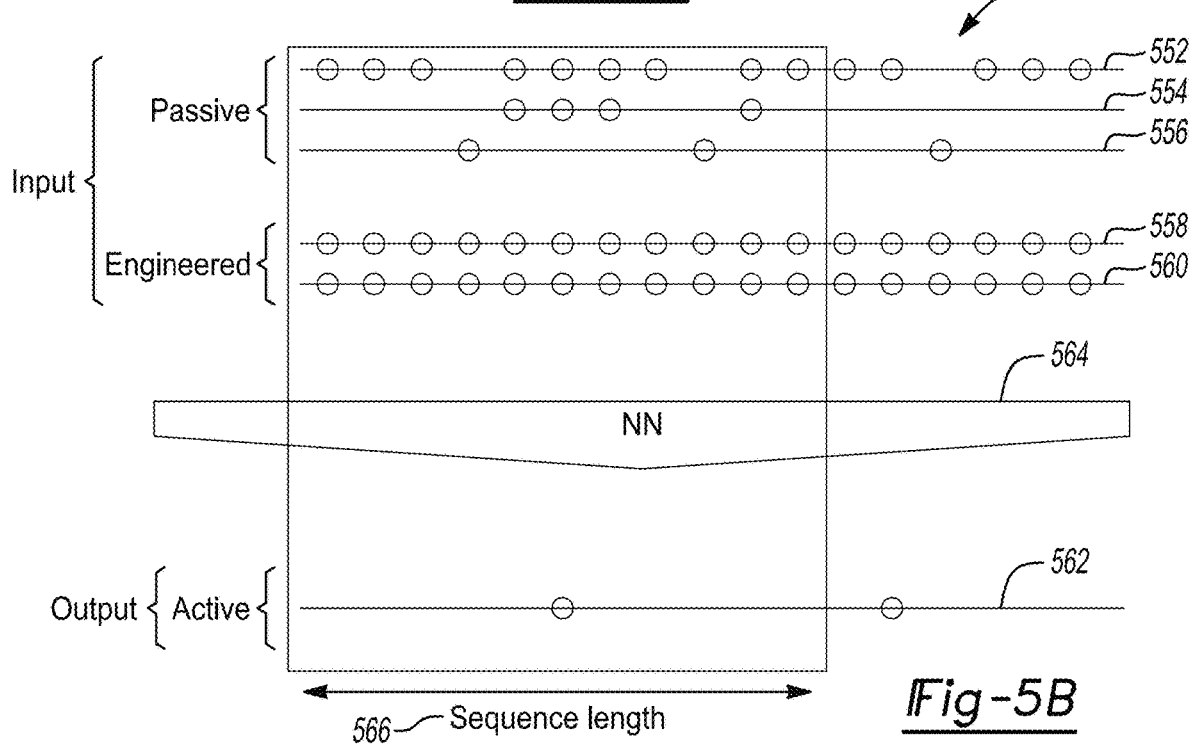
FIG. 5B is a graphical diagram that illustrates dataset structure used to predict QoS.

FIG. 5B is a graphical diagram 550 that illustrates dataset structure used to predict QoS. This diagram includes asynchronous inputs with synchronous outputs. The inputs are both passive and engineered data streams, for example, passive data may include primary cell data 552, secondary cell data 554, and uplink bandwidth 556. The primary and secondary cell data may include RSRP, RSRQ, or RSSI data. The engineered data may include active carrier 558 and time difference data 560. The outputs include an uplink throughput output 562 that is output from a trainable function 564 such as a neural network (NN).

Figure 6:
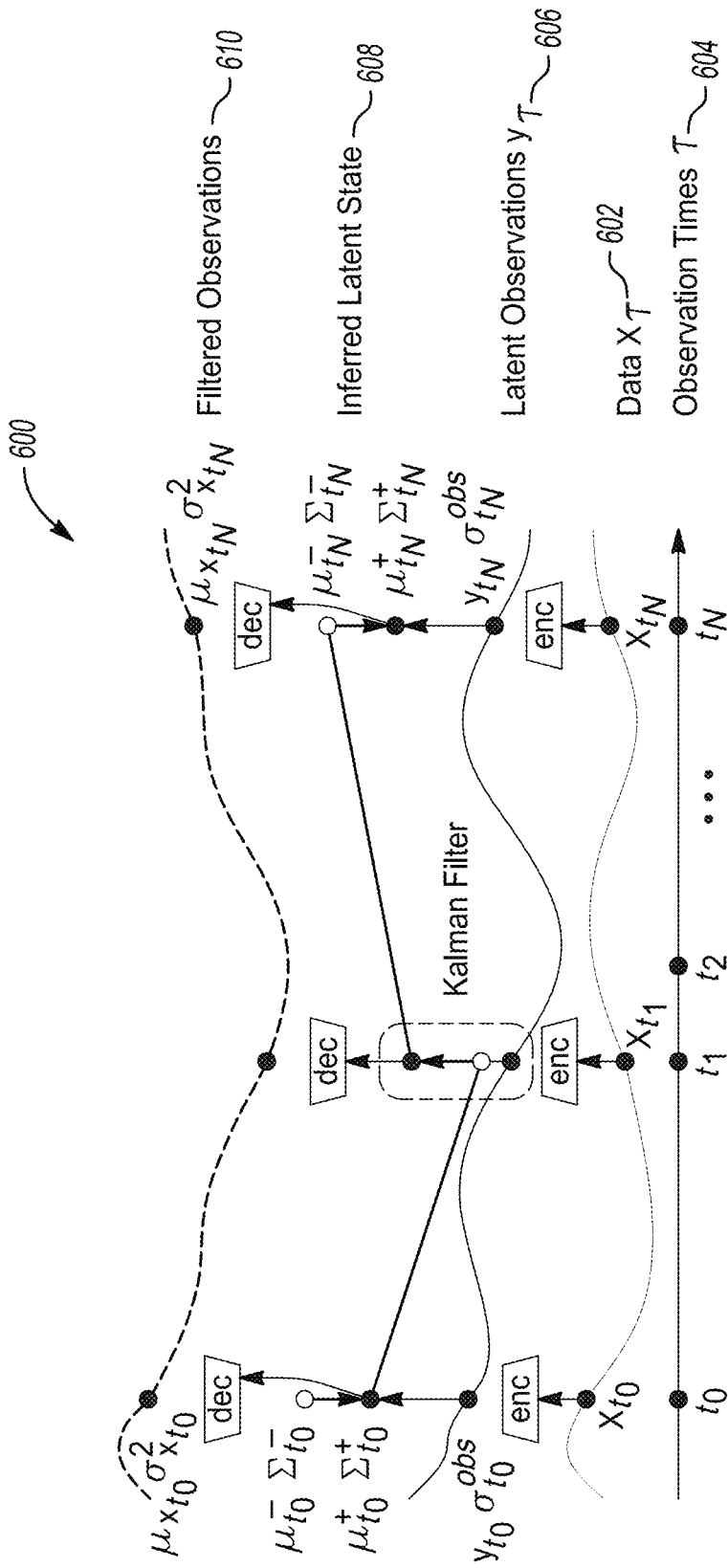
FIG. 6 is a graphical diagram that illustrates a continuous-discrete recurrent Kalman network applied according to an example embodiment of this disclosure.

FIG. 6 is a graphical diagram 600 that illustrates a continuous-discrete recurrent Kalman network (CDRKN) applied according to an example embodiment of this disclosure. The input data 602 is received at an observation time 604. The input data 602 is encoded to obtain latent observations 606 according to $$[y_t, \sigma_t^{obs}] = f_\theta(x_t). \qquad (2)$$

Then update the prior with latent observation to posterior according to obtain inferred latent state data 608 according to $$[\mu_t^+, \Sigma_t^+] = \text{update}(\mu_t^-, \Sigma_t^-, y_t, \Sigma_t^{obs}|H). \qquad (3)$$

And propagate continuous prior to the next observation time according to $$[\mu_{t'}^-, \Sigma_{t'}^-] = \text{predict}_A(\mu_t^+, \Sigma_t^+ | G, Q) \quad (4)$$

Then decode the posterior to observation space to obtain filtered observations 610 according to $$[\mu_{x_t}, \sigma_{x_t}^2] = g_\phi(\mu_t^+, \Sigma_t^+). \quad (5)$$

The continuous-discrete Kalman filter assumes continuous latent states that evolve according to the SDE $$dz = Azdt + Gd\beta \quad (6)$$

The discrete Gaussian observations sampled from the latent state at irregular intervals follows $$y_t \sim \mathcal{N}(Hz_t, \Sigma_t^{obs}) \quad (7)$$

This version of the Kalman filter allows modelling discrete observations at potentially arbitrary time-intervals as samples from a continuous trajectory of z. This is important due to the asynchronous nature of the input data. The continuous-discrete Kalman filter processes observations by alternating between:

(1) Update step (incorporating observations with Bayes' Theorem) as shown in equation (3).

(2) Prediction step (propagating the latent state to the next time step) as shown in equation (4).

In which the Update step includes a posterior mean (8), posterior covariance (9), and Kalman gain (10).

$$\mu_t^+ = \mu_t^- + K_t(y_t - H\mu_t^-) \quad (8)$$

$$\Sigma_t^+ = (I - K_t H)\Sigma_t^- \quad (9)$$

$$K_t = \Sigma_t^- H^T (H\Sigma_t^- H^T + \Sigma_t^{obs})^{-1} \quad (10)$$

And the prediction step includes a Prior mean (11) and Prior covariance (12).

$$\mu_{t'}^- = \exp(A(t'-t))\mu_t^+ \quad (1)$$

$$\Sigma_{t'}^- = \exp(A(t'-t))\Sigma_t^+ \exp(A(t'-t))^T + \int_t^{t'} \exp(A(t'-T)) GQG^T \exp(A(t'-T))^T dT \quad (12)$$

Figure 7:
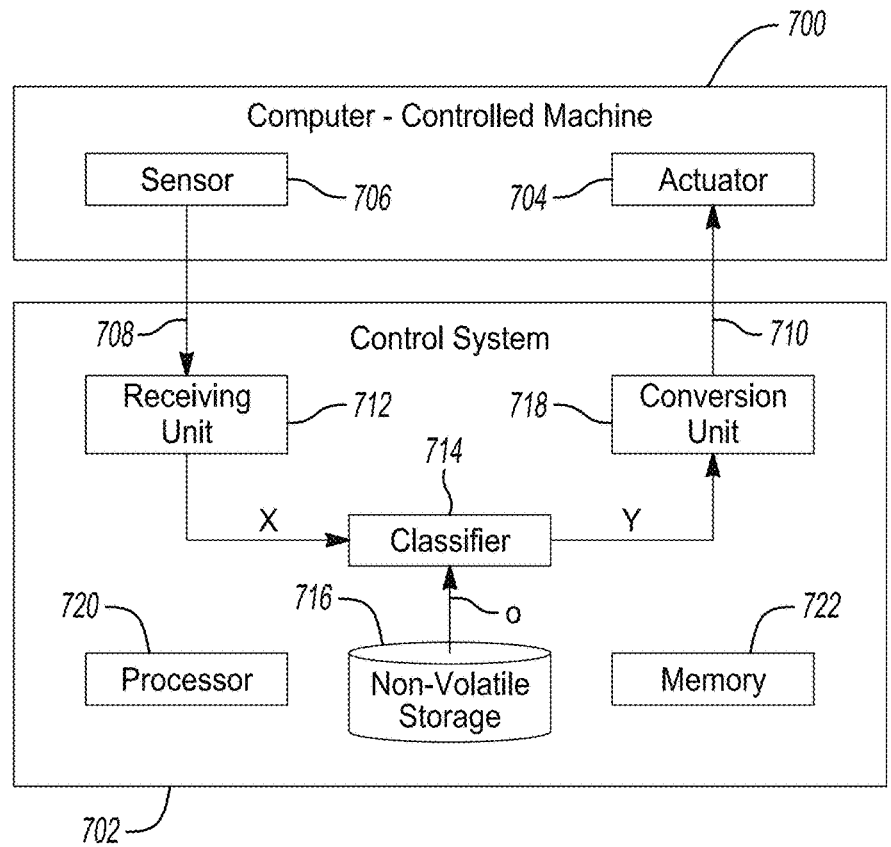
FIG. 7 depicts a schematic diagram of an interaction between a computer-controlled machine and a control system according to an example embodiment of this disclosure.

FIG. 7 depicts a schematic diagram of an interaction between computer-controlled machine 700 and control system 702. Computer-controlled machine 700 includes actuator 704 and sensor 706. Actuator 704 may include one or more actuators and sensor 706 may include one or more sensors. Sensor 706 is configured to sense an electromagnetic wave such as an RF signal. Sensor 706 may be configured to encode the sensed condition into sensor signals 708 and to transmit sensor signals 708 to control system 702. A non-limiting example of sensor 706 includes an RF receiver.

Control system 702 is configured to receive sensor signals 708 from computer-controlled machine 700. As set forth below, control system 702 may be further configured to compute actuator control commands 710 depending on the sensor signals and to transmit actuator control commands 710 to actuator 704 of computer-controlled machine 700.

As shown in FIG. 7, control system 702 includes receiving unit 712. Receiving unit 712 may be configured to receive sensor signals 708 from sensor 706 and to transform sensor signals 708 into input signals x. In an alternative embodiment, sensor signals 708 are received directly as input signals x without receiving unit 712. Each input signal x may be a portion of each sensor signal 708. Receiving unit 712 may be configured to process each sensor signal 708 to product each input signal x. Input signal x may include data corresponding to a data packet received by sensor 706.

Control system 702 includes classifier 714. Classifier 714 may be configured to classify input signals x into one or more labels using a machine learning (ML) algorithm via employing the trained machine learning system 140 (FIG. 1). Classifier 714 is configured to be parametrized by parameters, such as those described above that may be stored in and provided by non-volatile storage 716. Classifier 714 is configured to determine output signals y from input signals x. Each output signal y includes information that assigns one or more labels to each input signal x. Classifier 714 may transmit output signals y to conversion unit 718. Conversion unit 718 is configured to covert output signals y into actuator control commands 710. Control system 702 is configured to transmit control commands 710 to actuator 704, which is configured to actuate computer-controlled machine 700 in response to actuator control commands 710. In some embodiments, actuator 704 is configured to actuate computer-controlled machine 700 based directly on output signals y.

Upon receipt of control commands 710 by actuator 704, actuator 704 is configured to execute an action corresponding to the related actuator control command 710. Actuator 704 may include a control logic configured to transform actuator control commands 710 into a second actuator control command, which is utilized to control actuator 704. In one or more embodiments, actuator control commands 710 may be utilized to control a display instead of or in addition to an actuator.

In some embodiments, control system 702 includes sensor 706 instead of or in addition to computer-controlled machine 700 including sensor 706. Control system 702 may also include actuator 704 instead of or in addition to computer-controlled machine 700 including actuator 704. As shown in FIG. 7, control system 702 also includes processor 720 and memory 722. Processor 720 may include one or more processors. Memory 722 may include one or more memory devices. The classifier 714 (e.g., the trainable function, or trained machine learning system 140) of one or more embodiments may be implemented by control system 702, which includes non-volatile storage 716, processor 720, and memory 722.

Non-volatile storage 716 may include one or more persistent data storage devices such as a hard drive, optical drive, tape drive, non-volatile solid-state device, cloud storage or any other device capable of persistently storing information. Processor 720 may include one or more devices selected from high-performance computing (HPC) systems including high-performance cores, graphics processing units, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 722. Memory 722 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 720 may be configured to read into memory 722 and execute computer-executable instructions residing in non-volatile storage 716 and embodying one or more ML algorithms and/or methodologies of one or more embodiments. Non-volatile storage 716 may include one or more operating systems and applications. Non-volatile storage 716 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 720, the computer-executable instructions of non-volatile storage 716 may cause control system 702 to implement one or more of the ML algorithms and/or methodologies to employ the trained machine learning system 140 as disclosed herein. Non-volatile storage 716 may also include ML data (including model parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments. Furthermore, the processes, methods, or algorithms can be embodied in whole or in part using suitable hardware components, such as ASICs, FPGAs, state machines, controllers or other hardware components or devices, or a combination of hardware, software and firmware components.

Figure 8:
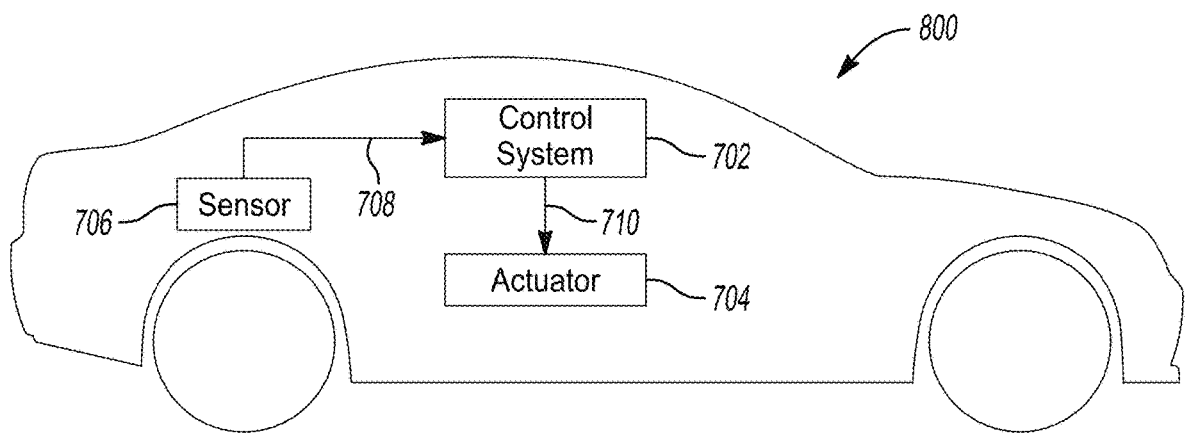
FIG. 8 depicts a schematic diagram of the control system of FIG. 7 that is configured to control a mobile machine, which is at least partially or fully autonomous, according to an example embodiment of this disclosure.

FIG. 8 depicts a schematic diagram of control system 702 configured to control vehicle 800, which may be at least a partially autonomous vehicle or a partially autonomous robot. Vehicle 800 includes actuator 704 and sensor 706. Sensor 706 may include one or more RF receivers. One or more of the one or more specific sensors may be integrated into vehicle 800 or may be electrically coupled with the vehicle 800. Alternatively or in addition to one or more specific sensors identified above, sensor 706 may include a software module configured to, upon execution, determine a state of actuator 704.

Classifier 714 of control system 702 of vehicle 800 may be configured to detect objects in the vicinity of vehicle 800 dependent on input signals x. In such an embodiment, output signal y may include information classifying or characterizing objects in a vicinity of the vehicle 800. Actuator control command 710 may be determined in accordance with this information. The actuator control command 710 may be used to avoid collisions with the detected objects.

In some embodiments, the vehicle 800 is an at least partially autonomous vehicle or a fully autonomous vehicle. The actuator 704 may be embodied in a brake, a propulsion system, an engine, a drivetrain, a steering of vehicle 800, etc. Actuator control commands 710 may be determined such that actuator 704 is controlled such that vehicle 800 avoids collisions with detected objects. Detected objects may also be classified according to what classifier 714 deems them most likely to be, such as pedestrians, trees, any suitable labels, etc. The actuator control commands 710 may be determined depending on the classification.

In some embodiments where vehicle 800 is at least a partially autonomous robot, vehicle 800 may be a mobile robot that is configured to carry out one or more functions, such as flying, swimming, diving and stepping. The mobile robot may be a lawn mower, which is at least partially autonomous, or a cleaning robot, which is at least partially autonomous. In such embodiments, the actuator control command 710 may be determined such that a propulsion unit, steering unit and/or brake unit of the mobile robot may be controlled such that the mobile robot may avoid collisions with identified objects. Based on transmission and reception of data via the RF sensor.

In some embodiments, vehicle 800 is an at least partially autonomous robot in the form of a gardening robot. In such embodiment, vehicle 800 may receive data from sensor 706 to determine a state of plants in an environment proximate to vehicle 800. Actuator 704 may be a nozzle configured to spray chemicals. Depending on an identified species and/or an identified state of the plants, actuator control command 710 may be determined to cause actuator 704 to spray the plants with a suitable quantity of suitable chemicals.

Vehicle 800 may be a robot, which is at least partially autonomous and in the form of a domestic appliance. As a non-limiting example, a domestic appliance may include a washing machine, a stove, an oven, a microwave, a dishwasher, etc. In such a vehicle 800, sensor 706 may receive data indicative of a state of an object which is to undergo processing by the household appliance. For example, in the case of the domestic appliance being a washing machine, sensor 706 may receive a state of the laundry inside the washing machine. Actuator control command 710 may be determined based on the detected state of the laundry.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of operating a wireless receiver system comprising:
   measuring a first Reference Signal Received Power (RSRP1) from a first carrier at a first time;
   measuring a second Reference Signal Received Power (RSRP2) from a second carrier at a second time;
   annotating the RSRP1 to the first carrier and the RSRP2 to the second carrier;
   in response to the first time and the second time being within a contemporaneous period, associating the RSRP1 and RSRP2 to the contemporaneous period;
   creating an N-Dimension vector of RSRP1 and RSRP2 at the contemporaneous period;
   processing the N-Dimension vector via a trainable function to obtain a predicted data rate; and
   in response to the predicted data rate falling below a normal operating range threshold, operating the system in a low bandwidth mode.

2. The method of claim 1, wherein the trainable function is a Neural Network.

3. The method of claim 2, wherein the Neural Network is a Continuous-Discrete Recurrent Kalman Network (CDRKN).

4. The method of claim 2, wherein the Neural Network is a Long short-term memory (LSTM) recurrent neural network (RNN).

5. The method of claim 1, further comprising, in response to the predicted data rate falling below a low operating range threshold, operating the system in a safe mode.

6. The method of claim 1, wherein 2 dimensions of the N-Dimension vector are associated with the RSRP1 and RSRP2 from the first and second carrier.

7. The method of claim 1, further comprising:
   based on a difference between the predicted data rate and an actual data rate, calculating a loss; and
   modifying the trainable function based on the loss.

8. The method of claim 7, wherein the loss is based on a mean square error loss function.

9. The method of claim 1, wherein the low bandwidth mode includes switching off a camera, reconfiguring a video codec, or reconfiguring an audio codec.

10. A wireless system comprising:
    a controller configured to,
    measure a first Reference Signal Received Power (RSRP1) from a first carrier at a first time;
    measure a second Reference Signal Received Power (RSRP2) from a second carrier at a second time;
    in response to the first time and the second time being within a contemporaneous period, associate the RSRP1 and RSRP2 to the contemporaneous period;
    create an N-Dimension vector of RSRP1 and RSRP2 at the contemporaneous period;
    process the N-Dimension vector via a trainable function to obtain a predicted data rate; and
    in response to the predicted data rate falling below a normal operating range threshold, operate the system in a low bandwidth mode.

11. The wireless system of claim 10, wherein the wireless system is a cellular phone, the predicted data rate is the predicted data rate on an application layer, and the low bandwidth mode includes reducing a sample rate of an audio codec.

12. The wireless system of claim 10, wherein the trainable function is a Neural Network that is a Continuous-Discrete Recurrent Kalman Network (CDRKN) or a Long short-term memory (LSTM) recurrent neural network (RNN).

13. The wireless system of claim 10, wherein the wireless system is associated with a vehicle and the low bandwidth mode includes switching off a camera or reconfiguring a video codec.

14. The wireless system of claim 10, wherein the controller is further configured to, based on a difference between the predicted data rate and an actual data rate, calculate a loss and modify the trainable function based on the loss, wherein the loss is based on a mean square error loss function.

15. A wireless system associated with a vehicle comprising:
    a processor; and
    a memory including instructions that, when executed by the processor, cause the processor to:
    measure a first Reference Signal Received Power (RSRP1) from a first carrier at a first time;
    measure a second Reference Signal Received Power (RSRP2) from a second carrier at a second time;
    annotate the RSRP1 to the first carrier and the RSRP2 to the second carrier;
    in response to the first time and the second time being within a contemporaneous period, associate the RSRP1 and RSRP2 to the contemporaneous period;
    create an N-Dimension vector of RSRP1 and RSRP2 at the contemporaneous period;
    process the N-Dimension vector via a trainable function to obtain a predicted data rate; and
    in response to the predicted data rate falling below a normal operating range threshold, operate the system in a low bandwidth mode.

16. The wireless system of claim 15, wherein the wireless system is a cellular phone, the predicted data rate is the predicted data rate on an application layer, and the low bandwidth mode includes reducing a sample rate of an audio codec.

17. The wireless system of claim 15, wherein the trainable function is a Neural Network.

18. The wireless system of claim 17, wherein the Neural Network is a Continuous-Discrete Recurrent Kalman Network (CDRKN) or a Long short-term memory (LSTM) recurrent neural network (RNN).

19. The wireless system of claim 15, wherein the wireless system is associated with a vehicle and the low bandwidth mode includes switching off a camera or reconfiguring a video codec.

20. The wireless system of claim 15, wherein the processor is further configured to, based on a difference between the predicted data rate and an actual data rate, calculate a loss and modify the trainable function based on the loss, wherein the loss is based on a mean square error loss function.

* * * * *